No. 684,453. Patented Oct. 15, 1901.
A. M. NEEPER.
DRIVING GEAR FOR VEHICLE WHEELS.
(Application filed May 11, 1900.)
(No Model.)
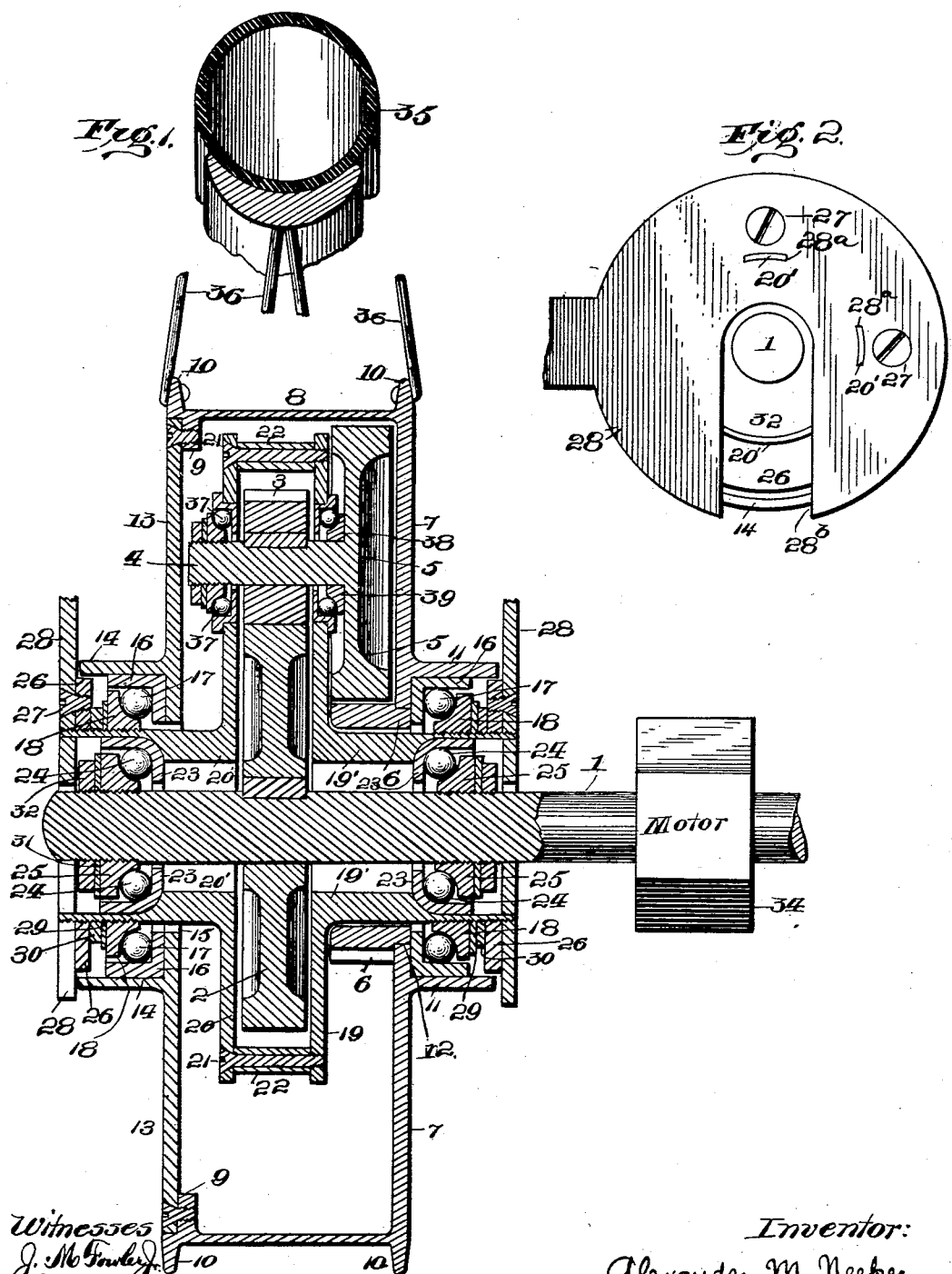
Inventor:
Alexander M. Neeper
by M. B. Corwin
Atty

UNITED STATES PATENT OFFICE.

ALEXANDER M. NEEPER, OF PITTSBURG, PENNSYLVANIA.

DRIVING-GEAR FOR VEHICLE-WHEELS.

SPECIFICATION forming part of Letters Patent No. 684,453, dated October 15, 1901.

Application filed May 11, 1900. Serial No. 16,304. (No model.)

*To all whom it may concern:*

Be it known that I, ALEXANDER M. NEEPER, a citizen of the United States, residing at Pittsburg, in the county of Allegheny and State of Pennsylvania, have invented new and useful Improvements in Driving-Gear for Vehicle-Wheels, of which the following is a specification.

My invention relates to improvements in driving-gear for vehicle-wheels which are rotated by means of power applied to rotating axles upon which they are mounted; and the object of it is to provide means within the hub of said wheels whereby the rate of rotation of the wheel may at the time of construction be made greater or less than the rate of rotation of the power-driven axle.

In the accompanying drawings, forming part of this specification, Figure 1 is a sectional view of my improved vehicle-wheel, and Fig. 2 is a detail view.

In the drawings, 1 is the power-driven axle, and 2 a gear-wheel fixedly mounted thereon. Gear-wheel 2 meshes into a pinion 3, mounted upon shaft 4. Gear-wheel 5, also mounted upon shaft 4, meshes into gear-wheel 6, which is attached to plate 7, forming part of the hub. Plate 7 has a circular flange 8, having a lip 9 and rims 10 for the attachment of the spokes of the wheel. Plate 7 has also a flange 11, which is annular in form, and an orifice 12 inside the flange.

13 is a plate which is attached to lip 9 of the plate 7, so that plates 7 and 13 constitute a case forming the hub of the wheel. Plate 13 has an annular flange 14 and an orifice or hole 15. In flanges 11 and 14 of plates 7 and 13, respectively, ball-bearing cups 16 are fitted, which are provided with balls 17, which in connection with cones 18 form the bearings upon which the hub of the wheel rotates independently of the bearings in which the gear-wheels 2, 3, and 5 and the power-driven axle 1 are mounted. The hub has no connection with any of them, except the connection formed by the meshing of gear-wheels 5 and 6.

19 and 20 are two plates having annular flanges 19' and 20', the plates being connected by screws 21, surrounded by sleeves or distance-pieces 22. The annular flanges 19' 20' are fitted with cups 23, in which are placed balls 24, which in connection with cones 25, screwed on the axle 1, form the bearings in which said axle rotates. The flanges 19' 20' are also fitted with rings 26, screwed thereon and fastened by screws 27 to disks 28, forming part of the frame of the vehicle. Portions of the flanges 19' and 20' project through holes 28ª and slots 28ᵇ in the disks 28, which prevents rotation of the flanges and of the plates 19 and 20 and their connected parts.

29 and 30 are the washers and lock-nuts of the bearings upon which the hub of the wheel rotates.

31 and 32 are washers and lock-nuts used in connection with the cone 25 and power-driven axle 1, all of said washers and lock-nuts being of the usual and ordinary construction.

34 is a motor fixed to the frame of the vehicle for driving the axle 1; but it will be understood that power may be applied to the axle in any desired manner.

35 is the rim of the wheel and the tire, and 36 represents spokes attached to the same in the ordinary way.

Shaft 4 is provided with ball-bearings 37, which are of the usual and ordinary construction, the cups for the balls of the same being mounted in holes in the plates 19 and 20 and the balls, cones, washers, and lock-nuts being arranged in the ordinary way with the exception that cone 38 is fixed to shaft 4, thus obviating the use in connection with it of a washer and lock-nut.

My improvement as herein shown and described is indicated as applied to a wheel wherein the rate of rotation of the wheel by means of the gearing shown is raised above the rate of rotation of the power-driven axle; but the wheel may be constructed so that its rate of rotation shall be below the rate of rotation of the axle, as would be necessary where a high-speed electric motor is driving a wheel of a vehicle operated at moderate speed, this being accomplished by arranging the relations between the gear-wheels in the train between the power-driven axle and the vehicle-wheel in the usual way to attain the slower rate of rotation of the vehicle-wheel. I do not wish, therefore, to be limited in the scope of my invention to wheels wherein the speed of the wheel is raised above the speed of the rotation of its axle, but to be understood that the scope of my invention includes wheels whose speed of rotation may be raised or lowered above or below the speed of rotation of their power-driven axles.

I claim—

In driving-gear for vehicle-wheels, the combination of a power-driven axle; plates forming part of the frame of the vehicle; a fixed non-rotating case having vertical side plates and horizontal annular flanges with portions extending through the said plates forming part of the frame of the vehicle to prevent rotation of the case; a rotating hub inclosing said case and having vertical side plates and horizontal flanges; bearings between the horizontal flanges of the case and hub; bearings between the axle and the flanges of the case; and means contained within the hub for driving it from the axle.

In testimony whereof I have hereunto subscribed my name to this specification in the presence of two subscribing witnesses.

ALEXANDER M. NEEPER.

Witnesses:
GEO. E. TERRY,
W. B. CORWIN.